US011031776B2

(12) United States Patent
Delshadpour et al.

(10) Patent No.: US 11,031,776 B2
(45) Date of Patent: Jun. 8, 2021

(54) OVERVOLTAGE PROTECTION DEVICE AND A METHOD FOR OPERATING AN OVERVOLTAGE PROTECTION DEVICE

(71) Applicant: NXP B.V., Eindhoven (NL)

(72) Inventors: Siamak Delshadpour, Phoenix, AZ (US); Xiaoqun Liu, Chandler, AZ (US)

(73) Assignee: NXP B.V., Eindhoven (NL)

( * ) Notice: Subject to any disclaimer, the term of this patent is extended or adjusted under 35 U.S.C. 154(b) by 182 days.

(21) Appl. No.: 16/184,808

(22) Filed: Nov. 8, 2018

(65) Prior Publication Data

US 2020/0153240 A1    May 14, 2020

(51) Int. Cl.
*H02H 9/04* (2006.01)

(52) U.S. Cl.
CPC ..................... *H02H 9/04* (2013.01)

(58) Field of Classification Search
CPC ............ H02H 9/04; H02H 9/046; H02H 9/00; H02H 9/042; H02H 3/28; H02H 3/20; H02H 3/202; H02H 3/25; G01R 19/16519
See application file for complete search history.

(56) References Cited

U.S. PATENT DOCUMENTS

| 6,414,533 | B1 | 7/2002 | Graves | |
|---|---|---|---|---|
| 9,054,517 | B1* | 6/2015 | Zhu | H02H 9/04 |
| 9,461,465 | B1* | 10/2016 | Tam | H02H 3/20 |
| 2007/0064362 | A1* | 3/2007 | Migliavacca | H02H 11/003 361/82 |
| 2007/0182449 | A1* | 8/2007 | Taylor | H04L 5/14 326/80 |
| 2009/0207544 | A1* | 8/2009 | Boyko | H03K 19/00315 361/91.1 |
| 2010/0207596 | A1* | 8/2010 | Xu | H03K 17/223 323/303 |
| 2015/0092307 | A1* | 4/2015 | Petruzzi | H02H 9/041 361/56 |
| 2016/0091940 | A1 | 3/2016 | Oh et al. | |
| 2016/0149391 | A1* | 5/2016 | Jain | H02H 9/046 361/91.5 |
| 2018/0062517 | A1* | 3/2018 | Cheng | H02H 7/1213 |
| 2018/0254641 | A1* | 9/2018 | Kadirvel | H02J 7/008 |
| 2020/0136381 | A1* | 4/2020 | Wu | H02H 1/0007 |

* cited by examiner

*Primary Examiner* — Gustavo A Rosario-Benitez

(57) ABSTRACT

Embodiments of overvoltage protection devices and a method for operating an overvoltage protection device are disclosed. In an embodiment, an overvoltage protection device includes a switch circuit connected between an input terminal from which an input voltage is received and an output terminal from which an output voltage is output and including multiple NMOS transistors and multiple PMOS transistors connected in series between the input terminal and the output terminal, a first voltage generation circuit configured to, generate a first voltage that is applied to the NMOS transistors and a second voltage that is applied to a body of each of the PMOS transistors, in response to the input voltage and a supply voltage, and a second voltage generation circuit configured to generate a third voltage that is applied to the PMOS transistors in response to the input voltage and the first voltage.

14 Claims, 3 Drawing Sheets

OVERVOLTAGE PROTECTION DEVICE AND A METHOD FOR OPERATING AN OVERVOLTAGE PROTECTION DEVICE

BACKGROUND

An overvoltage protection device can be used to protect an analog circuit and/or a digital circuit when an input voltage is higher than the breakdown voltage of the analog circuit and/or the digital circuit. A typical overvoltage protection device that employs one or more switches uses a charge pump or a voltage regulator to control gate voltage of the switches used for protection. However, the additional charge pump or voltage regulator introduces additional complexity to the overvoltage protection device. In addition, when an additional charge pump or voltage regulator is used in the overvoltage protection device, a clamp is usually needed to protect input pins and switches. However, the clamp itself may consume high current and cause considerable power consumption and circuit area.

SUMMARY

Embodiments of overvoltage protection devices and a method for operating an overvoltage protection device are disclosed. In an embodiment, an overvoltage protection device includes a switch circuit connected between an input terminal from which an input voltage is received and an output terminal from which an output voltage is output, a first voltage generation circuit, and a second voltage generation circuit. The switch circuit includes multiple NMOS transistors connected in series between the input terminal and the output terminal and multiple PMOS transistors connected in series between the input terminal and the output terminal. The first voltage generation circuit is configured to, generate a first voltage that is applied to the NMOS transistors and a second voltage that is applied to a body of each of the PMOS transistors, in response to the input voltage and a supply voltage. The second voltage generation circuit is configured to generate a third voltage that is applied to the PMOS transistors in response to the input voltage and the first voltage. Other embodiments are also described.

In an embodiment, the first voltage is applied to a gate terminal of each of the NMOS transistors.

In an embodiment, the third voltage is applied to a gate terminal of each of the PMOS transistors.

In an embodiment, the NMOS transistors are connected in parallel with the PMOS transistors.

In an embodiment, the second voltage generation circuit includes a first resistor connected to the input terminal and to the switch circuit, a first PMOS transistor connected to the first resistor and to the PMOS transistors of the switch circuit, and a second resistor connected to the first PMOS transistor and a fixed voltage.

In an embodiment, the first voltage is applied to a gate terminal of the first PMOS transistor.

In an embodiment, the second voltage is applied to a body of the first PMOS transistor.

In an embodiment, a resistance of the first resistor is less than one tenth of a resistance of the second resistor.

In an embodiment, the first voltage generation circuit includes a first voltage selector connected to the supply voltage, a voltage divider connected to the input terminal and to a fixed voltage, and a second voltage selector connected to the input terminal and to the supply voltage. The first voltage selector is configured to generate the first voltage that is applied to a gate terminal of each of the NMOS transistors. The second voltage selector is configured to generate the second voltage.

In an embodiment, the second voltage selector is configured to select the highest voltage of the input voltage and the supply voltage as the second voltage.

In an embodiment, the voltage divider includes a first resistor connected to the input terminal and to the second voltage selector, a first PMOS transistor connected to the first resistor and to the first voltage selector, and a second resistor connected to a drain terminal of the first PMOS transistor and a fixed voltage.

In an embodiment, the first voltage selector is configured to select the highest voltage of a voltage at the drain terminal of the first PMOS transistor and the supply voltage as the first voltage.

In an embodiment, the supply voltage is applied to a gate terminal of the first PMOS transistor.

In an embodiment, a resistance of the first resistor is around a resistance of the second resistor.

In an embodiment, an overvoltage protection device includes a switch circuit connected between an input terminal of the overvoltage protection device from which an input voltage is received and an output terminal of the overvoltage protection device from which an output voltage is output, a first voltage generation circuit, and a second voltage generation circuit. The switch circuit includes first and second NMOS transistors connected in series between the input terminal and the output terminal, and first and second PMOS transistors connected in series between the input terminal and the output terminal and in parallel with the first and second NMOS transistors. The first voltage generation circuit is configured to, generate a first voltage that is applied to a gate terminal of each of the first and second NMOS transistors and a second voltage applied to a body of each of the first and second PMOS transistors, in response to the input voltage and a supply voltage. The second voltage generation circuit is configured to generate a third voltage that is applied to a gate terminal of each of the first and second PMOS transistors in response to the input voltage and the first voltage.

In an embodiment, the second voltage generation circuit includes a first resistor connected to the input terminal and to the switch circuit, a third PMOS transistor connected to the first resistor and to the first and second PMOS transistors of the switch circuit, where the first voltage is applied to a gate terminal of the third PMOS transistor, and wherein the second voltage is applied to a body of the third PMOS transistor, and a second resistor connected to the third PMOS transistor and a fixed voltage.

In an embodiment, the first voltage generation circuit includes a first voltage selector connected to the supply voltage, where the first voltage selector is configured to generate the first voltage, a voltage divider connected to the input terminal and to the fixed voltage, and a second voltage selector connected to the input terminal and to the supply voltage, where the second voltage selector is configured to generate the second voltage.

In an embodiment, the voltage divider includes a third resistor connected to the input terminal and to the second voltage selector, a fourth PMOS transistor connected to the third resistor and to the first voltage selector, and a fourth resistor connected to a drain terminal of the fourth PMOS transistor and the fixed voltage.

In an embodiment, the second voltage selector is configured to select the highest voltage of the input voltage and the supply voltage as the second voltage, and wherein the first voltage selector is configured to select the highest voltage of a voltage at the drain terminal of the fourth PMOS transistor and the supply voltage as the first voltage.

In an embodiment, a method for operating an overvoltage protection device involves in response to an input voltage that is received at an input terminal of the overvoltage protection device and a supply voltage, generating a first voltage that is applied to a plurality of NMOS transistors connected in series between the input terminal and an output terminal and a second voltage that is applied to a body of each of a plurality of PMOS transistors connected in series between the input terminal and the output terminal, and in response to the input voltage and the first voltage, generating a third voltage that is applied to gate terminals of the PMOS transistors.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
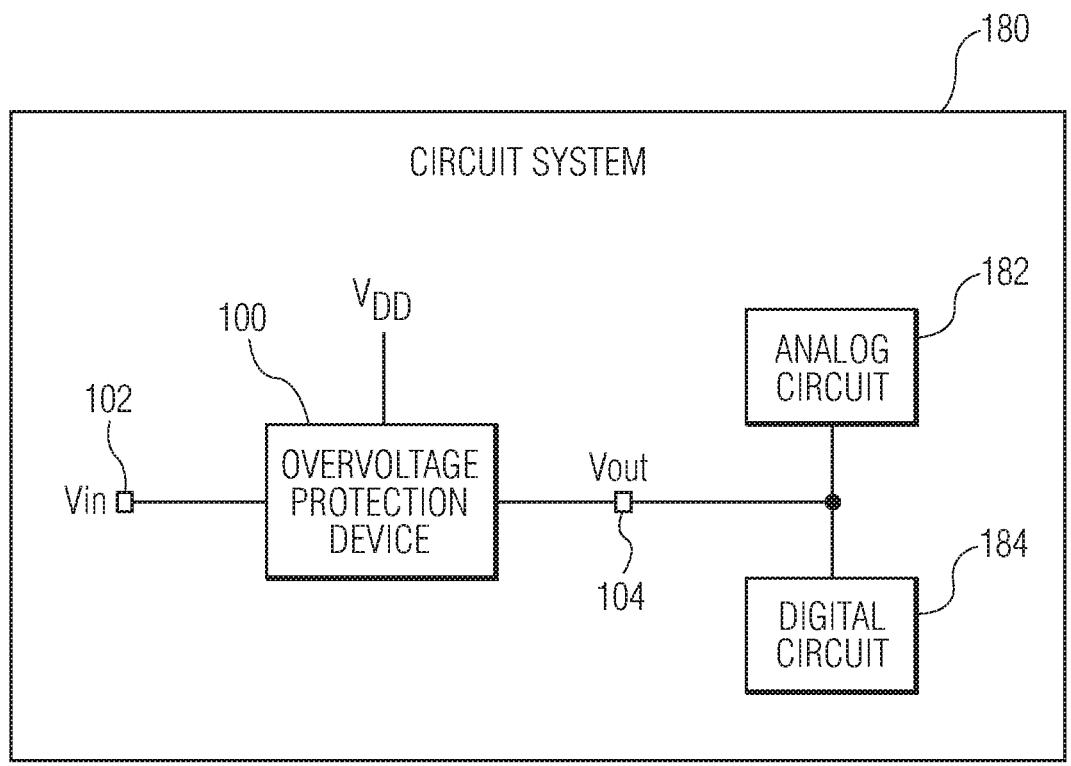
FIG. 1 is a schematic block diagram of a circuit system that includes an overvoltage protection device, an analog circuit to be protected by the overvoltage protection, and a digital circuit to be protected by the overvoltage protection device in accordance with an embodiment of the invention.

FIG. 1 is a schematic block diagram of a circuit system 180 that includes an overvoltage protection device 100, an analog circuit 182 to be protected by the overvoltage protection, and a digital circuit 184 to be protected by the overvoltage protection device in accordance with an embodiment of the invention. The overvoltage protection device can be used to protect the analog circuit and the digital circuit when an input voltage, $V_{in}$, which is received at an input terminal 102 (i.e., the input voltage, $V_{in}$, is the voltage at the input terminal), is higher than the breakdown voltage of the analog circuit and the breakdown voltage of the digital circuit. The input terminal may be implemented as an electrical terminal, such as an electrical contact pad or an electrical contact pin. The overvoltage protection device generates a desired output voltage, $V_{out}$, at an output terminal 104 that is below the breakdown voltage of the analog circuit and the breakdown voltage of the digital circuit. The output terminal may be implemented as an electrical terminal, such as an electrical contact pad or an electrical contact pin. The overvoltage protection device can be used in various applications, such as automotive applications, communications applications, industrial applications, medical applications, computer applications, and/or consumer or appliance applications. In some embodiments, the overvoltage protection device is included in a computing device, such as a smartphone, a tablet computer, a laptop, etc. In some embodiments, the overvoltage protection device is implemented in a substrate, such as a semiconductor wafer or a printed circuit board (PCB). In an embodiment, the overvoltage protection device is packaged as a stand-alone semiconductor IC chip. Although the circuit system is shown in FIG. 1 as including certain circuit elements, in other embodiments, the circuit system may include one or more additional circuit elements. For example, the circuit system may include a supply voltage generator configured to generate a supply voltage, $V_{DD}$, for the overvoltage protection device.

The overvoltage protection device 100 depicted in FIG. 1 allows the input voltage, $V_{in}$, to be applied to the analog circuit 182 and the digital circuit 184 when the input voltage, $V_{in}$, is higher than the breakdown voltage of the analog circuit and the breakdown voltage of the digital circuit, and converts the input voltage, $V_{in}$, into a desired output voltage, $V_{out}$, that is lower than the breakdown voltage of the analog circuit and the breakdown voltage of the digital circuit, when the input voltage, $V_{in}$, is equal to or higher than the breakdown voltage of the analog circuit and the breakdown voltage of the digital circuit. Compared to a typical overvoltage protection device that uses a charge pump or a voltage regulator to control gate voltage of the switches used for protection, the overvoltage protection device depicted in FIG. 1 does not need a charge pump or a voltage regulator to control gate voltage of the switches used for protection. Consequently, compared to a typical overvoltage protection device that uses a charge pump or a voltage regulator to control gate voltage of the switches used for protection, the overvoltage protection device depicted in FIG. 1 can be implemented using less circuit components and/or in less area. In addition, compared to a typical overvoltage protection device that uses a charge pump or a voltage regulator to control gate voltage of the switches used for protection, the overvoltage protection device depicted in FIG. 1 does not require a clamp to protect the input terminal 102. Consequently, compared to a typical overvoltage protection device that uses a charge pump or a voltage regulator to control gate voltage of the switches used for protection, the overvoltage protection device depicted in FIG. 1 has lower power consumption.

Figure 2:
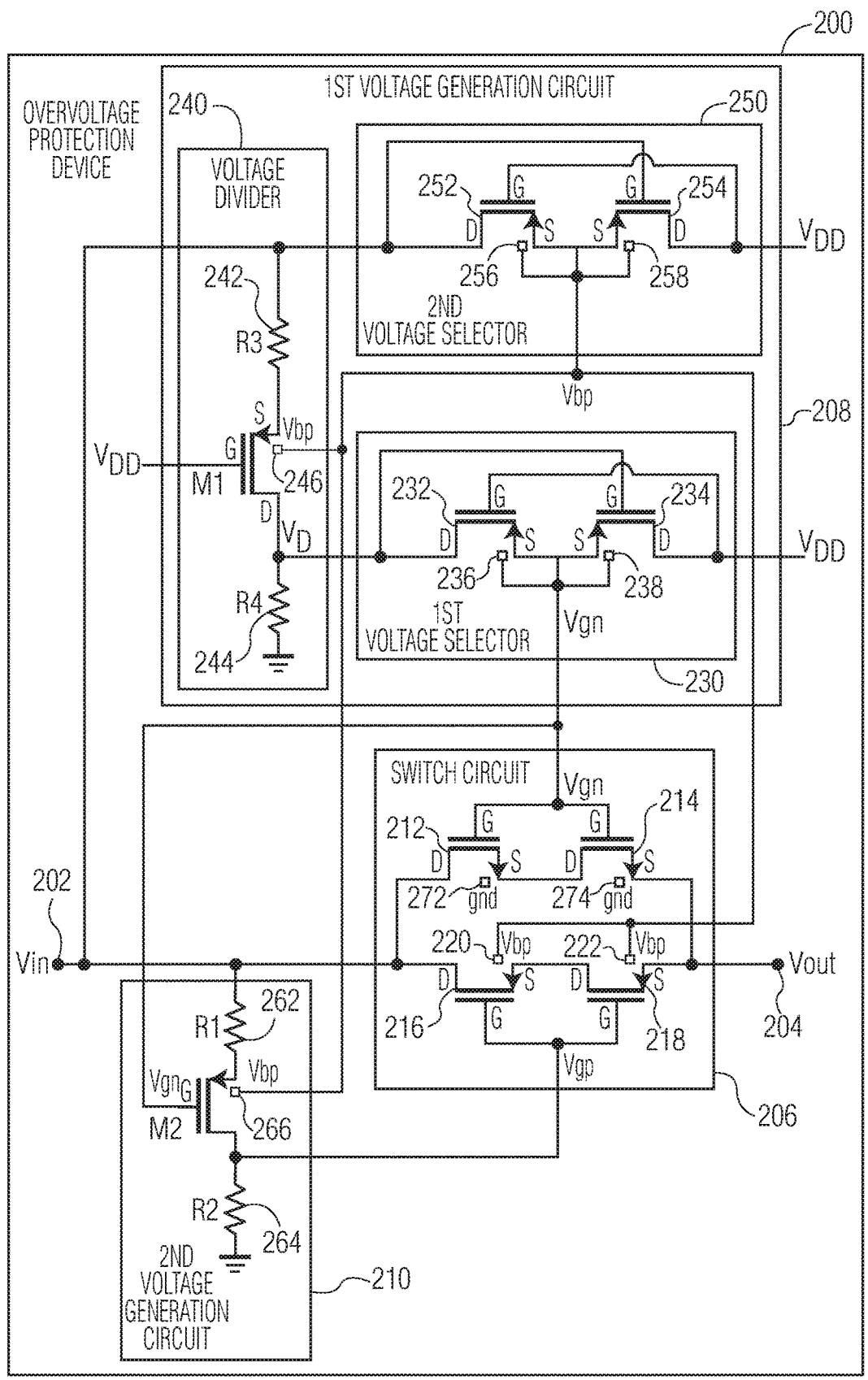
FIG. 2 depicts an embodiment of the overvoltage protection device of the circuit system depicted in FIG. 1.

FIG. 2 depicts an overvoltage protection device 200, which is an embodiment of the overvoltage protection device 100 depicted in FIG. 1. In the embodiment depicted in FIG. 2, the overvoltage protection device 200 includes an input terminal 202, an output terminal 204, a switch circuit 206, a first voltage generation circuit 208, and a second voltage generation circuit 210. The overvoltage protection device receives an input voltage, $V_{in}$, at an input terminal 202 and generates a desired output voltage, $V_{out}$, at the output terminal 204 that is below the breakdown voltage of a circuit to be protected, such as the analog circuit 182 and/or the digital circuit 184 depicted in FIG. 1. The input terminal and/or the output terminal may be implemented as an electrical terminal, such as an electrical contact pad or an electrical contact pin. The overvoltage protection device 200 depicted in FIG. 2 is one possible embodiment of the overvoltage protection device 100 depicted in FIG. 1. However, the overvoltage protection device 100 depicted in FIG. 1 is not limited to the embodiment shown in FIG. 2.

Compared to a typical overvoltage protection device that uses a charge pump or a voltage regulator to control gate voltage of the switches used for protection, the overvoltage protection device 200 depicted in FIG. 2 does not need a charge pump or a voltage regulator to control gate voltage of switches used for protection. Consequently, compared to a typical overvoltage protection device that uses a charge pump or a voltage regulator to control gate voltage, the overvoltage protection device depicted in FIG. 2 can be implemented using less circuit components and/or in less area. In addition, compared to a typical overvoltage protection device that uses a charge pump or a voltage regulator to control gate voltage of switches used for protection, the overvoltage protection device depicted in FIG. 2 does not require a clamp to protect the input terminal 202. Consequently, compared to a typical overvoltage protection device that uses a charge pump or a voltage regulator to control gate voltage of switches used for protection, the overvoltage protection device depicted in FIG. 2 has lower power consumption.

In the embodiment depicted in FIG. 2, the switch circuit 206 is connected between the input terminal of the overvoltage protection device from which the input voltage, $V_{in}$, is received and the output terminal 204 of the overvoltage protection device from which the output voltage, $V_{out}$, is output. The switch circuit may include NMOS transistors and PMOS transistors connected in series between the input terminal and the output terminal. In the embodiment depicted in FIG. 2, the switch circuit includes two NMOS transistors 212, 214 connected in series between the input terminal and the output terminal and two PMOS transistors 216, 218 connected in series between the input terminal and the output terminal and in parallel with the first and second NMOS transistors. In some embodiments, the body 272, 274 of each of the NMOS transistors 212, 214 is connected to a fixed voltage, e.g., the ground.

In the embodiment depicted in FIG. 2, the first voltage generation circuit includes a first voltage selector 230 connected to a supply voltage, $V_{DD}$, a voltage divider 240 connected to the input terminal 202 and to a fixed voltage (e.g., ground), and a second voltage selector 250 connected to the input terminal and to the supply voltage, $V_{DD}$. The first voltage generation circuit 208 is configured to, generate a voltage, $V_{gn}$, that is applied to a gate terminal, G, of each of the NMOS transistors 212, 214, and a voltage, $V_{bp}$, that is applied to a body 220 or 222 of each of the PMOS transistors 216, 218, in response to the input voltage, $V_{in}$, and the supply voltage, $V_{DD}$.

In the embodiment depicted in FIG. 2, the voltage divider 240 includes a resistor 242 connected to the input terminal and to the second voltage selector, a PMOS transistor, M1, connected to the resistor 242 (e.g., through its source terminal, S) and to the first voltage selector, and a resistor 244 connected to the drain terminal, G, of the PMOS transistor, M1, and a fixed voltage (e.g., ground). In some embodiments, the resistance, R3, of the resistor 242 is about the same as the resistance, R4, of the resistor 244 (e.g., within a ±5% range of the resistance, R4, of the resistor 244).

In the embodiment depicted in FIG. 2, the first voltage selector 230 is configured to generate the voltage, $V_{gn}$, that is applied to the gate terminal, G, of each of the NMOS transistors 212, 214. In the embodiment depicted in FIG. 2, the first voltage selector 230 includes PMOS transistors 232, 234. The gate terminal, G, of the PMOS transistor 232 is connected to the supply voltage, $V_{DD}$, and the drain terminal, D, of the PMOS transistor 232 is connected to the voltage, $V_D$, at the drain terminal, D, of the PMOS transistor, M1. The gate terminal, G, of the PMOS transistor 234 is connected to the voltage, $V_D$, at the drain terminal, D, of the PMOS transistor, M1, and the drain terminal, D, of the PMOS transistor 234 is connected to the supply voltage, $V_{DD}$. The source terminal, S, of the PMOS transistor 232 is connected to the source terminal, S, of the PMOS transistor 234, to the body 236 of the PMOS transistor 232, and to the body 238 of the PMOS transistor 234. The first voltage selector is configured to select the highest voltage of the voltage, $V_D$, at the drain terminal, D, of the PMOS transistor, M1, and the supply voltage, $V_{DD}$, as the voltage, $V_{gn}$.

In the embodiment depicted in FIG. 2, the second voltage selector 250 is configured to generate the voltage, $V_{bp}$, that is applied to the body 220 or 222 of each of the PMOS transistors 216, 218 and the body 246 of the PMOS transistor, M1, of the voltage divider 240, based on the input voltage, $V_{in}$, and the supply voltage, $V_{DD}$. In the embodiment depicted in FIG. 2, the second voltage selector includes PMOS transistors 252, 254. The gate terminal, G, of the PMOS transistor 252 is connected to the supply voltage, $V_{DD}$, and the drain terminal, D, of the PMOS transistor 252 is connected to the input voltage, $V_{in}$. The gate terminal, G, of the PMOS transistor 254 is connected to the input voltage, $V_{in}$, and the drain terminal, D, of the PMOS transistor 254 is connected to the supply voltage, $V_{DD}$. The source terminal, S, of the PMOS transistor 252 is connected to the source terminal, S, of the PMOS transistor 254, to the body 256 of the PMOS transistor 252, and to the body 258 of the PMOS transistor 254. The second voltage selector is configured to select the highest voltage of the input voltage, $V_{in}$, and the supply voltage, $V_{DD}$, as the voltage, $V_{bp}$.

In the embodiment depicted in FIG. 2, the second voltage generation circuit 210 includes a resistor 262 connected to the input terminal 202 and to the switch circuit 206, a PMOS transistor, M2, connected to the resistor 262 and to the PMOS transistors 216, 218 of the switch circuit, and a resistor 264 connected to the PMOS transistor, M2, and a fixed voltage (e.g., ground). In some embodiments, the resistance, R1, of the resistor 262 is far less than the resistance, R2, of the resistor 264 (e.g., less than one tenth of the resistance, R2, of the resistor 264). The voltage, $V_{gn}$, which is generated by the first voltage selector 230 is applied to the gate terminal, G, of the PMOS transistor, M2, and the voltage, $V_{bp}$, which is generated by the second voltage selector 250, is applied to the body 266 of the PMOS transistor, M2. The second voltage generation circuit is configured to, generate a voltage, $V_{gp}$, that is applied to the gate terminal, G, of each of the PMOS transistors 216, 218, in response to the input voltage, $V_{in}$, and the voltage, $V_{gn}$.

An example operation of the overvoltage protection device 200 is described as follows. In the example operation, the maximum of the supply voltage, $V_{DD}$, is 1.8 Volt (V), the maximum of the input voltage, $V_{in}$, is 3.6V, the PMOS/NMOS threshold voltage, $V_{th}$, is at 0.6V, and the break down voltage of a circuit to be protected is 2.5V. When the supply voltage, $V_{DD}$, is at 1.8V, and the input voltage, $V_{in}$, is higher than the sum of the supply voltage, $V_{DD}$, and the PMOS/NMOS threshold voltage, $V_{th}$, the second voltage selector 250 selects the highest voltage of the input voltage, $V_{in}$, and the supply voltage, $V_{DD}$, as the voltage, $V_{bp}$ (i.e., $V_{bp}=V_{in}$) The transistor, M1, is turned on (i.e., conductive), and the voltage, $V_D$, at the drain terminal, D, of the PMOS transistor, M1, is around half of the input voltage, $V_{in}$, (e.g., the resistance value, R3, of the resistor 242 being around the same as the resistance value, R4, of the resistor 244). The first voltage selector 230 selects the highest voltage of the voltage, $V_D$, at the drain terminal, D, of the PMOS transistor, M1, and the supply voltage, $V_{DD}$, as the voltage, $V_{gn}$ (i.e., $V_{gn}=V_{DD}$) The transistor, M2, is turned on (i.e., conductive), and the voltage, $V_{gp}$, is around the input voltage, $V_{in}$ (e.g., the resistance value, R2, of the resistor 264 being greatly higher (e.g., 10 times or more) than the resistance value, R1, of the resistor 262) Because the voltage, $V_{gp}$, at the gate of the PMOS transistors 216, 218 is high, the PMOS transistors 216, 218 are turned off (i.e., non-conductive). Because the sum of the voltage, $V_{gu}$, at the gate of the NMOS transistors 212, 214 and the PMOS/NMOS threshold voltage, $V_{th}$, is lower than the input voltage, $V_{in}$, the NMOS transistors 212, 214 are turned on (i.e., conductive), and the output voltage, $V_{out}$, is equal to the sum (e.g., 2.4V) of the supply voltage, $V_{DD}$, (e.g., 1.8V) and the PMOS/NMOS threshold voltage, $V_{th}$, (e.g., 0.6V), which is lower than the break down voltage (e.g., 2.5V) of a circuit to be protected.

When the supply voltage, $V_{DD}$, is at 1.8V, and the input voltage, $V_{in}$, is higher than the supply voltage, $V_{DD}$, but is lower than the sum of the supply voltage, $V_{DD}$, and the PMOS/NMOS threshold voltage, $V_{th}$, the second voltage selector 250 selects the highest voltage of the input voltage, $V_{in}$, and the supply voltage, $V_{DD}$, as the voltage, $V_{bp}$ (i.e., $V_{bp}=V_{in}$) The transistor, M1, is turned off (i.e., non-conductive), and the voltage, $V_D$, at the drain terminal, D, of the PMOS transistor, M1, is ground (0V). The first voltage selector 230 selects the highest voltage of the voltage, $V_D$, at the drain terminal, D, of the PMOS transistor, M1, and the supply voltage, $V_{DD}$, as the voltage, $V_{gn}$ (i.e., $V_{gn}=V_{DD}$) The transistor, M2, is turned off (i.e., non-conductive), and the voltage, $V_{gp}$, is ground (0V). Because the voltage, $V_{gp}$, is low and the voltage, $V_{gn}$, is high, the PMOS transistors 216, 218 and the NMOS transistors 212, 214 are turned on (i.e., conductive), and the output voltage, $V_{out}$, is equal to the input voltage, $V_{in}$, which is lower than the break down voltage of a circuit to be protected.

When the supply voltage, $V_{DD}$, is at 1.8V, and the input voltage, $V_{in}$, is lower than the supply voltage, $V_{DD}$, the second voltage selector 250 selects the highest voltage of the input voltage, $V_{in}$, and the supply voltage, $V_{DD}$, as the voltage, $V_{bp}$ (i.e., $V_{bp}=V_{DD}$) The transistor, M1, is turned off (i.e., non-conductive), and the voltage, $V_D$, at the drain terminal, D, of the PMOS transistor, M1, is ground (0V). The first voltage selector 230 selects the highest voltage of the voltage, $V_D$, at the drain terminal, D, of the PMOS transistor, M1, and the supply voltage, $V_{DD}$, as the voltage, $V_{gn}$ (i.e., $V_{gn}=V_{DD}$) The transistor, M2, is turned off (i.e., non-conductive), and the voltage, $V_{gp}$, is ground (0V) Because the voltage, $V_{gp}$, is low and the voltage, $V_{gn}$, is high, the PMOS transistors 216, 218 and the NMOS transistors 212, 214 are turned on (i.e., conductive), and the output voltage, $V_{out}$, is equal to the input voltage, $V_{in}$, which is lower than the break down voltage of a circuit to be protected.

When the supply voltage, $V_{DD}$, is at 0V, and the input voltage, $V_{in}$, is positive but lower than 2 times of the PMOS/NMOS threshold voltage, $V_{th}$, all transistors, M1, M2, 212, 214, 216, 218, 210, 206, 230, 244 and 250 receive voltages that are lower than the breakdown voltage.

When the supply voltage, $V_{DD}$, is at 0V, and the input voltage, $V_{in}$, is higher than 2 times of the PMOS/NMOS threshold voltage, $V_{th}$, the second voltage selector 250 selects the highest voltage of the input voltage, $V_{in}$, and the supply voltage, $V_{DD}$, as the voltage, $V_{bp}$ (i.e., $V_{bp}=V_{in}$) The transistor, M1, is turned on (i.e., conductive), and the voltage, $V_D$, at the drain terminal, D, of the PMOS transistor, M1, is around half of the input voltage, $V_{in}$, (e.g., the resistance value, R3, of the resistor 242 being around the same as the resistance value, R4, of the resistor 244). The first voltage selector 230 selects the highest voltage of the voltage, $V_D$, at the drain terminal, D, of the PMOS transistor, M1, and the supply voltage, $V_{DD}$, as the voltage, $V_{gn}$ (i.e., $V_{gn}=V_{in}/2$) The transistor, M2, is turned on (i.e., conductive), and the voltage, $V_{gp}$, is around the input voltage, $V_{in}$, (e.g., the resistance value, R2, of the resistor 264 being greatly higher (e.g., 10 times or more) than the resistance value, R1, of the resistor 262) The PMOS transistors 216, 218 are turned off (i.e., non-conductive). Because the voltage, $V_{gn}$, is high, while the NMOS transistors 212, 214 are turned on (i.e., conductive) because the voltage, $V_{gn}$, is higher than the threshold voltage, $V_{th}$. Consequently, the output voltage, $V_{out}$, is equal to the input voltage, $V_{in}$. When the input voltage, $V_{in}$, increases, the output voltage, $V_{out}$, also increases, but never goes above the half of the input voltage, $V_{in}$. The output voltage, $V_{out}$, is lower than the break down voltage of a circuit to be protected and is lower than $V_{in}/2$, which is 1.8V when the input voltage, $V_{in}$, is 3.6V.

Figure 3:
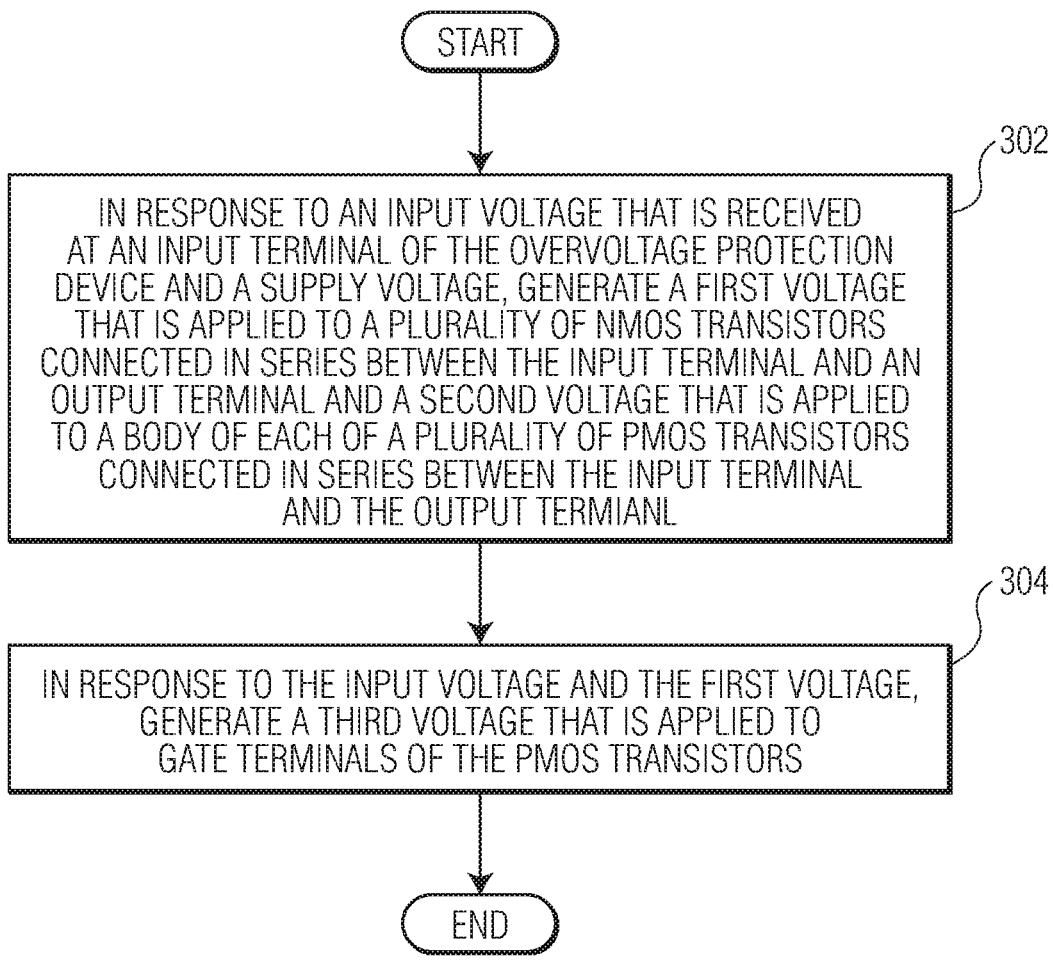
FIG. 3 is a process flow diagram of a method for operating an overvoltage protection device in accordance with an embodiment of the invention.

FIG. 3 is a process flow diagram of a method for operating an overvoltage protection device in accordance with an embodiment of the invention. At block 302, in response to an input voltage that is received at an input terminal of the overvoltage protection device and a supply voltage, a first voltage that is applied to multiple NMOS transistors connected in series between the input terminal and an output terminal and a second voltage that is applied to a body of each of multiple PMOS transistors connected in series between the input terminal and the output terminal are generated. At block 304, in response to the input voltage and the first voltage, a third voltage that is applied to gate terminals of the PMOS transistors is generated. The overvoltage protection device may be the same as or similar to the overvoltage protection device 100 depicted in FIG. 1 and/or the overvoltage protection device 200 depicted in FIG. 2.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An overvoltage protection device, the overvoltage protection device comprising:
    a switch circuit connected between an input terminal from which an input voltage is received and an output terminal from which an output voltage is output, wherein the switch circuit comprises:
        a plurality of NMOS transistors connected in series between the input terminal and the output terminal; and
        a plurality of PMOS transistors connected in series between the input terminal and the output terminal;
    a first voltage generation circuit configured to, generate a first voltage that is applied to the NMOS transistors and a second voltage that is applied to a body of each of the PMOS transistors, in response to the input voltage and a supply voltage; and
    a second voltage generation circuit configured to generate a third voltage that is applied to the PMOS transistors in response to the input voltage and the first voltage;
    wherein the first voltage generation circuit comprises:
        a first voltage selector connected to the supply voltage, wherein the first voltage selector is configured to generate the first voltage that is applied to a gate terminal of each of the NMOS transistors;
        a voltage divider connected to the input terminal and to a fixed voltage; and
        a second voltage selector connected to the input terminal and to the supply voltage, wherein the second voltage selector is configured to generate the second voltage; and wherein the second voltage selector is configured to select a highest voltage of the input voltage and the supply voltage as the second voltage.

2. The overvoltage protection device of claim 1, wherein the first voltage is applied to a gate terminal of each of the NMOS transistors.

3. The overvoltage protection device of claim 1, wherein the third voltage is applied to a gate terminal of each of the PMOS transistors.

4. The overvoltage protection device of claim 1, wherein the NMOS transistors are connected in parallel with the PMOS transistors.

5. The overvoltage protection device of claim 1, wherein the second voltage generation circuit comprises:
    a first resistor connected to the input terminal and to the switch circuit;
    a first PMOS transistor connected to the first resistor and to the PMOS transistors of the switch circuit; and
    a second resistor connected to the first PMOS transistor and a fixed voltage.

6. The overvoltage protection device of claim 5, wherein the first voltage is applied to a gate terminal of the first PMOS transistor.

7. The overvoltage protection device of claim 5, wherein the second voltage is applied to a body of the first PMOS transistor.

8. The overvoltage protection device of claim 5, wherein a resistance of the first resistor is less than one tenth of a resistance of the second resistor.

9. The overvoltage protection device of claim 1, wherein the voltage divider comprises:
    a first resistor connected to the input terminal and to the second voltage selector;
    a first PMOS transistor connected to the first resistor and to the first voltage selector; and
    a second resistor connected to a drain terminal of the first PMOS transistor and the fixed voltage.

10. The overvoltage protection device of claim 9, wherein the first voltage selector is configured to select a highest voltage of a voltage at the drain terminal of the first PMOS transistor and the supply voltage as the first voltage.

11. The overvoltage protection device of claim 9, wherein the supply voltage is applied to a gate terminal of the first PMOS transistor.

12. The overvoltage protection device of claim 9, wherein a resistance of the first resistor is around a resistance of the second resistor.

13. An overvoltage protection device, the overvoltage protection device comprising:
    a switch circuit connected between an input terminal of the overvoltage protection device from which an input voltage is received and an output terminal of the overvoltage protection device from which an output voltage is output, wherein the switch circuit comprises:
        first and second NMOS transistors connected in series between the input terminal and the output terminal; and
        first and second PMOS transistors connected in series between the input terminal and the output terminal and in parallel with the first and second NMOS transistors;
    a first voltage generation circuit configured to, generate a first voltage that is applied to a gate terminal of each of the first and second NMOS transistors and a second voltage applied to a body of each of the first and second PMOS transistors, in response to the input voltage and a supply voltage; and a second voltage generation circuit configured to generate a third voltage that is applied to a gate terminal of each of the first and second PMOS transistors in response to the input voltage and the first voltage;
wherein the second voltage generation circuit comprises,
a first resistor connected to the input terminal and to the switch circuit;
a third PMOS transistor connected to the first resistor and to the first and second PMOS transistors of the switch circuit, wherein the first voltage is applied to a gate terminal of the third PMOS transistor, and wherein the second voltage is applied to a body of the third PMOS transistor; and
a second resistor connected to the third PMOS transistor and a fixed voltage;
wherein the first voltage generation circuit comprises,
a first voltage selector connected to the supply voltage, wherein the first voltage selector is configured to generate the first voltage;
a voltage divider connected to the input terminal and to the fixed voltage; and
a second voltage selector connected to the input terminal and to the supply voltage, wherein the second voltage selector is configured to generate the second voltage;
wherein the voltage divider comprises,
a third resistor connected to the input terminal and to the second voltage selector;
a fourth PMOS transistor connected to the third resistor and to the first voltage selector; and
a fourth resistor connected to a drain terminal of the fourth PMOS transistor and the fixed voltage; and
wherein the second voltage selector is configured to select a highest voltage of the input voltage and the supply voltage as the second voltage, and wherein the first voltage selector is configured to select the highest voltage of a voltage at the drain terminal of the fourth PMOS transistor and the supply voltage as the first voltage.

14. An overvoltage protection device, the overvoltage protection device comprising:
a switch circuit connected between an input terminal from which an input voltage is received and an output terminal from which an output voltage is output, wherein the switch circuit comprises:
a plurality of NMOS transistors connected in series between the input terminal and the output terminal; and
a plurality of PMOS transistors connected in series between the input terminal and the output terminal;
a first voltage generation circuit configured to, generate a first voltage that is applied to the NMOS transistors and a second voltage that is applied to a body of each of the PMOS transistors, in response to the input voltage and a supply voltage; and
a second voltage generation circuit configured to generate a third voltage that is applied to the PMOS transistors in response to the input voltage and the first voltage;
wherein the first voltage generation circuit comprises,
a first voltage selector connected to the supply voltage, wherein the first voltage selector is configured to generate the first voltage that is applied to a gate terminal of each of the NMOS transistors;
a voltage divider connected to the input terminal and to a fixed voltage; and
a second voltage selector connected to the input terminal and to the supply voltage, wherein the second voltage selector is configured to generate the second voltage;
wherein the voltage divider comprises:
a first resistor connected to the input terminal and to the second voltage selector;
a first PMOS transistor connected to the first resistor and to the first voltage selector; and
a second resistor connected to a drain terminal of the first PMOS transistor and the fixed voltage; and
wherein the first voltage selector is configured to select a highest voltage of a voltage at the drain terminal of the first PMOS transistor and the supply voltage as the first voltage.

* * * * *